United States Patent [19]

Langos

[11] Patent Number: 4,594,067
[45] Date of Patent: Jun. 10, 1986

[54] MOLD CLOSING DEVICE

[75] Inventor: Peter Langos, Siegburg, Fed. Rep. of Germany

[73] Assignee: Mauser-Werke GmbH, Bruhl, Fed. Rep. of Germany

[21] Appl. No.: 718,777

[22] Filed: Apr. 1, 1985

[30] Foreign Application Priority Data

May 8, 1984 [DE] Fed. Rep. of Germany ....... 3416871

[51] Int. Cl.$^4$ .............................................. B29C 45/67
[52] U.S. Cl. ................................ 425/451.9; 425/589; 425/DIG. 221
[58] Field of Search ..... 425/595, 522, 533, DIG. 221, 425/451.7, 451.9

[56] References Cited

U.S. PATENT DOCUMENTS

| | | | |
|---|---|---|---|
| 4,038,015 | 7/1977 | Dawson | 425/451.7 |
| 4,105,385 | 8/1978 | Hehl | 425/451.9 |
| 4,315,727 | 2/1982 | Black | 425/589 |
| 4,372,738 | 2/1983 | Black et al. | 425/451.9 |
| 4,403,810 | 9/1983 | Bieneck | 425/589 |
| 4,425,091 | 1/1984 | Prince | 425/589 |
| 4,487,564 | 12/1984 | Von Holdt | 425/589 |

Primary Examiner—Willard E. Hoag
Attorney, Agent, or Firm—Pennie & Edmonds

[57] ABSTRACT

A mold closing system for plastic fabricating machines, having a separate transport means for carrying the mold halves toward and away from one another, and separate locking means mounted on the mold halves and operable at the end of the transport movement to lock the mold halves together after the transport means is shut off.

6 Claims, 2 Drawing Figures

MOLD CLOSING DEVICE

BACKGROUND OF THE INVENTION

1. Field of the Invention

The invention relates to a molding apparatus. In particular the invention relates to a mold closing device for fabricating machines for plastics by which at least one of the mold halves can be shifted between the open position and the closed position. After the mold halves are placed in the closed position, they are releaseably locked to each other.

2. Description of the Prior Art

In known mold closing devices, hydraulic cylinders are used to move the mold halves between their opened and closed positions. The hydraulic cylinders are positioned such that they engage the backs of plates on which the mold halves are mounted. Once the hydraulic cylinders move the mold halves to the closed position, the halves are locked up. This type of apparatus involves a central system of movement; that is, the power for locking the mold halves together has to be supplied by the same hydraulic cylinders which supply the moving power. Alternatively, some apparatus known in the art use mechanical devices to lock up the mold after it is closed. These mechanical devices usually act in the manner of toggle fasteners.

The locking force required to hold the mold closed varies depending upon the process being performed (i.e., blow molding or injection molding) and the specific product being fabricated. It is therefore necessary to use hydraulic cylinders designed to supply a variety of force magnitudes. In prior art apparatus, the same cylinders provide all the necessary movement forces, even though only relatively low forces are necessary for transporting the mold halves compared to the forces necessary for locking up the mold halves. In order to provide the forces necessary to lock up the mold halves, the hydraulic cylinders must butt against the frame of the mold apparatus. This limits the locations at which the cylinders can be mounted in on any one machine. When large mold holders or mounting plates are used, the hydraulic cylinders provide an irregular distribution of the locking forces and consequently varying deformations occur within the clamping plates. The same problems occur even when the locking forces from the hydraulic cylinders are transmitted directly to the mold halves. The high bending forces exerted by the cylinders against the beams of the machine body require that the free ends of the beams be coupled by a yoke. This coupling limits the space available for mold changing or product removal. What room there is existing within the frame of the apparatus is additionally limited by the presence of the large hydraulic cylinders within the space of the framework.

It is easily seen, therefore, that the prior art design results in an expensive, heavy machine with greatly oversized hydraulic apparatus and its attendant high consumption of hydraulic fluid. The fixed arrangement of cylinders causes an unfavorable pattern of force application and greatly restricts the space for mold installation. An apparatus that combines the mold transport and mold lock-up functions greatly restricts the applications of the plastic fabricating machine because there are limits to the size of the mold which can be used. This limitation is further aggravated by the need for the machine body to withstand the reaction forces of the compression cylinders.

In order to avoid the use of heavy or reinforced framework or beams, the deformation forces on the machine body must be eliminated while providing good distribution of the closing and locking forces over the mold halves. This should be done using a movement mechanism which is smaller and more powerful than those used in prior art devices in order to optimize the space within the plastic fabricating machine.

SUMMARY OF THE INVENTION

The mentioned problems are solved by the apparatus of the present invention. The invention separates the old transport and mold lock-up functions into two means. The transport movement of the mold halves relative to one another is performed by a separate transport means which moves the mold halves toward one another until a slight gap remains between them. The remaining gap is closed by locking means which operates separately from the transport means, and is attached directly to the mold holders. In operation the locking means moves the mold halves against one another to the locked state while assuring equal and opposite application of forces between the mold halves.

Providing two independent systems of movement and decentralizing their control allows substantial freedom in controlling the mold halves. This makes it possible to locate the points for the application of the locking force at the most desirable locations on the mold halves of each mold. The separating of the two functions causes a reduction of hydraulic fluid consumption, and better utilization of space. The reaction forces caused by the clamping action of the locking means are used as closing and locking forces in a system of equal and opposite application forces. This system eliminates the need for anchoring the cylinders to expensive body beams, increase the working space and allows the locking means to be arranged at advantageous locations on the mold halves or clamping plates. The locking forces can be applied in a controlled manner to the mold halves which permits substantial interchangeability of the mold halves or mounting plates, and hence an expansion of the applications of the plastic fabricating machine.

The invention has a special advantage. Because it is a system of equal and opposite application of forces within the mold closing system, it requires only easily releaseable attachment to the machine body. Thus, the mold closing unit as a whole can be prepared as a separate unit and then inserted as a whole into the machine. This greatly facilitates repair work and maintenance.

In a further development of the invention, the mold transport system can be located in the area outside the mold halves. This allows the mold closing system to be assembled with all of the actuating devices in a single unit.

During the operation of the mold closing system of the invention, for example in a blow molding process, the extruded tube passes between the mold halves while they are in their fully open position. At the end of the extrusion step, the mold halves are moved together until a gap approximately equal to the thickness of the collapsed tube remains. Then the latches of the closing mechanism are linked together and the transport system shuts off. The latches are then energized hydraulically so that the mold halves are drawn together and locked in the closed position. The mold closure has sufficient force to pinch the tube off and weld it shut at the seams. The latches can be positioned as desired so that a uniform clamping force is exercised on the mold halves in accordance with the stresses of the mold. Proper placement of the links greatly limits deformation of the mold along with its harmful consequences.

BRIEF DESCRIPTION OF THE DRAWINGS

The mold closing system is represented diagramatically in the drawings. A blow-molding machine is used as an example, although the invention can be used on other apparatus as will become apparent to those skilled in the art.

DESCRIPTION OF THE PREFERRED EMBODIMENT

Figure 1:
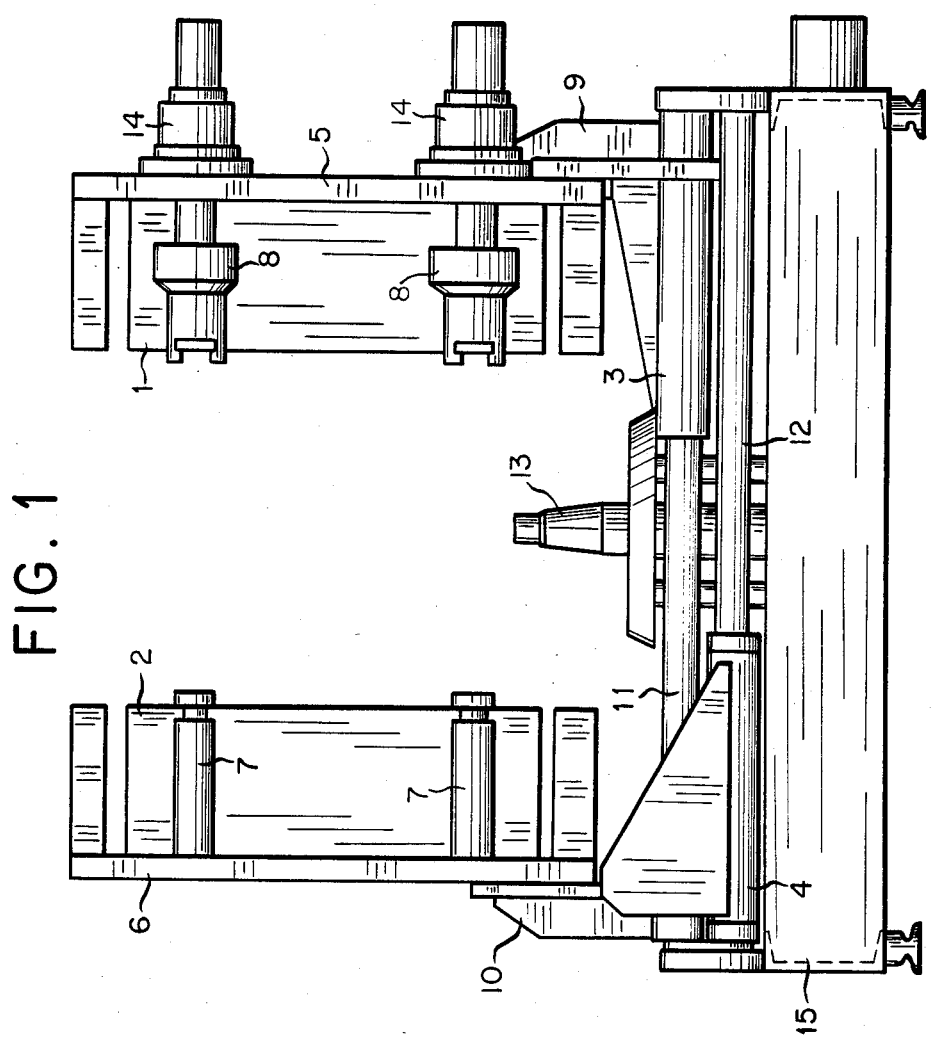
FIG. 1 shows a mold closing system constructed in accordance with the present invention with the mold halves open.

The mold closing system of the preferred embodiment includes two hydraulic cylinders 3, 4 which are adapted to move in a horizontal direction along slide rods 11, 12. Attached to the hydraulic cylinders 3, 4 are brackets 9, 10 which have mold holders or mounting plates 5, 6 releasably mounted thereto. The mounting plates 5, 6 carry the mold halves 1, 2 and distribute the closing forces on the molds.

In operation the activation of hydraulic cylinders 3, 4 moves the cylinders and brakets 9, 10 relative the frame 15. In this way the cylinders 3, 4 are used to provide the transport forces to move the mold halves between the opened and closed positions.

The locking means functions separately from the transport means and includes a plurality of locking members connected to mounting plates 5, 6. In the embodiment shown, the locking means includes fixed catch members 7 which are attached to mounting plate 6 and gripping catch members 8 are attached to mounting plate 5. The gripping catch members are movable in the direction of movement of mold halves 1, 2. Gripping catch members 8 are driven by a hydraulic cylinders 14.

Figure 2:
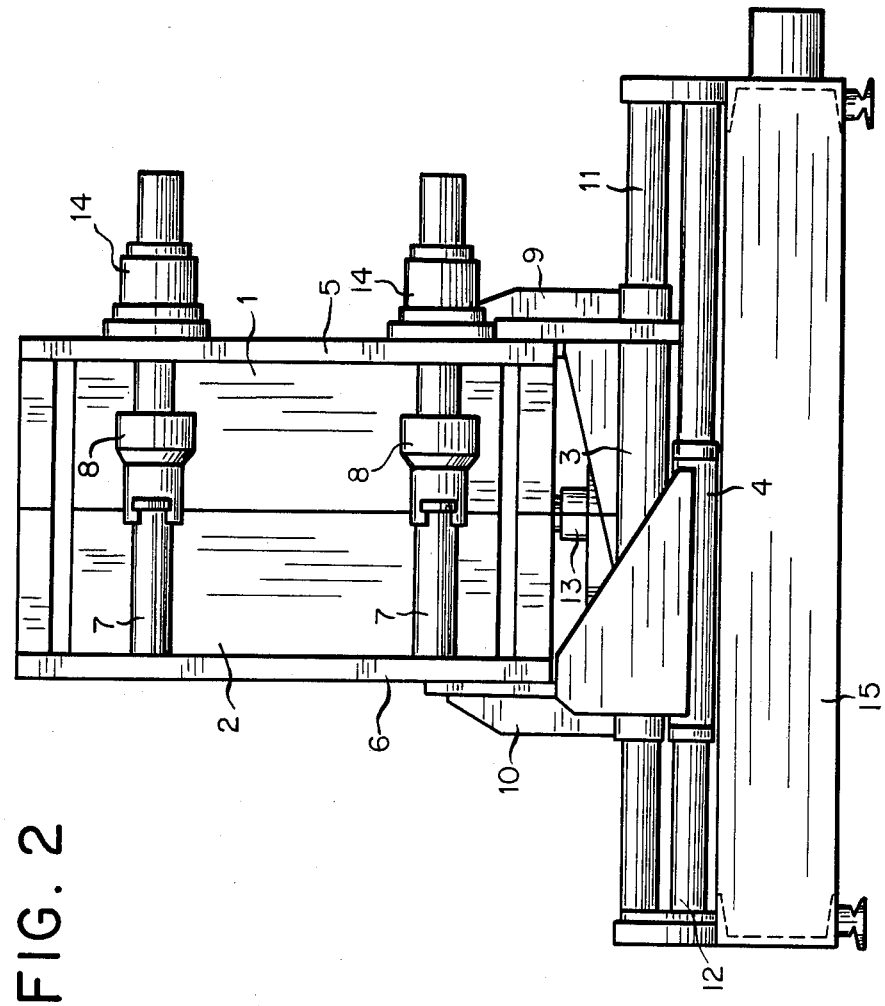
FIG. 2. shows the apparatus of FIG. 1 with the mold halves closed.

After the tube (not shown) has been extruded from the die (not shown), between mold halves 1, 2 of the open mold, the mold halves are driven by the transport system from their opened position represented in FIG. 2 to a partially closed position. The catch members 7 and gripping catch members 8 are aligned along and move along a predetermined axis until the fixed catch members 7 snap into the gripping catch members 8. At this point the mold is not yet locked and there remains a gap between the mold halves 1, 2 that corresponds to approximately twice the wall thickness of the tube. After the coupling operation has ended, the transport means is shut off.

The next step is lock-up of the mold halves. Here greater forces are necessary because the tube is to be held between the mold halves 1, 2 and must be pinched off and welded shut by the tube's own heat at the upper and lower seams. The closing and lock-up is performed by energizing the cylinders 14 of the gripping catch members 8 to pull the catch members 8 to the right, as viewed in FIG. 2, and to thus pull the catch members 7 in the same direction. The cylinders 14 are mounted on one of the mold halves and pull the halves together through the catch members 7, 8. The cylinders 14 are preferably mounted in alignment with the catches along their predetermined axis. The mold halves 1, 2 are thus drawn tightly together and clamped through the mold holders 5, 6.

The coupling and locking system is one of equal and opposite application forces sandwiching the mold halves so it requires no special abutment. Because no special abutment is required, one is largely free to choose any desired arrangement and layout of the locking means on the mold holder. In this manner the closing forces can be optimized to eliminate or greatly reduce deformation.

The blow mandrel 13 provides the blowing pressure which is introduced into the tube that is closed between the mold halves. At the end of the blowing operation, the cylinders 14 are released and the coupling halves 7, 8 are separated. The transport system is turned on and mold halves 1, 2 are moved to the opened position represented in FIG. 1, permitting the molded product to be removed.

The separately operating transport means is contained in the outer area of mold halves 1, 2. In the embodiment shown in the drawings, the transport means is situated underneath the mold halves. These positions are chosen to optimize the usable space of the apparatus.

1. A mold closing system for a plastic fabricating machine by which at least one mold half is driven between an opened and a closed position and upon closing said mold half is releasably locked to the other mold half, said closing system comprising:
    (a) a transport device for transporting said mold half, relatively toward the other mold half until there is a predetermined gap between the mold halves, and
    (b) a separate locking means for moving said mold halves together to the fully closed and locked position by the application of equal and opposite clamping forces operable independently of said transport device.

2. A mold closing system according to claim 1 wherein:
    (a) said separate locking means includes:
        (1) first catches disposed on one of the mold halves, and
        (2) cooperating second catches on the opposing mold half for coupling to the first catches, and
        (3) hydraulic means mounted on the opposing mold half and connected to said second catches for pulling the first catches with the second catches in a direction to move the mold halves together with the force of the hydraulic means.

3. The mold closing system according to claim 1 wherein:
    (a) the transport device is mounted outside the space between the mold halves.

4. A mold closing system for a plastic fabricating machine for moving, closing and locking the mold halves comprising:
    (a) transport device for moving the mold halves between a fully opened position and a position where the mold halves are separated by a predetermined gap;
    (b) separate locking means operable independently of said transport device and including:
        (1) first catches mounted on one of the mold halves;
        (2) second catches for coupling with said first catches, said second catches being movably mounted on said other mold half for movement along a predetermined axis, said first and second catches being aligned along said predetermined axis; and (3) hydraulic means mounted on the other mold half in alignment with said catches along said predetermined axis and connected to said second catches for pulling said first and second catches, when coupled together, along said predetermined axis and in a direction to move the mold halves together and into locked position.

5. A mold closing system according to claim 4 wherein:
   (a) the first and second catches are aligned with each other to couple together as the transport device moves the mold halves to the closed position.

6. A mold closing system according to claim 5 wherein:
   (a) the transport device is mounted outside the space between the mold halves.

* * * * *